United States Patent
Kamran et al.

(10) Patent No.: US 11,262,945 B2
(45) Date of Patent: Mar. 1, 2022

(54) QUALITY OF SERVICE (QOS) SYSTEM AND METHOD FOR NON-VOLATILE MEMORY EXPRESS DEVICES

(71) Applicant: EMC IP Holding Company, LLC, Hopkinton, MA (US)

(72) Inventors: Lior Kamran, Rishon LeZion (IL); Amitai Alkalay, Kadima (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 16/668,561

(22) Filed: Oct. 30, 2019

(65) Prior Publication Data
US 2021/0132858 A1 May 6, 2021

(51) Int. Cl.
*G06F 3/06* (2006.01)

(52) U.S. Cl.
CPC ............ *G06F 3/0659* (2013.01); *G06F 3/061* (2013.01); *G06F 3/0679* (2013.01)

(58) Field of Classification Search
CPC ...... G06F 3/0659; G06F 3/061; G06F 3/0679; G06F 3/0688; G06F 3/0613

USPC ........................................................ 711/154
See application file for complete search history.

(56) References Cited

U.S. PATENT DOCUMENTS

| | | | |
|---|---|---|---|
| 2003/0076849 A1* | 4/2003 | Morgan et al. | |
| 2014/0331001 A1* | 11/2014 | Liu ................ | G06F 3/0659 711/103 |
| 2016/0154839 A1* | 6/2016 | Bezawada .......... | G06F 21/64 707/692 |
| 2019/0310913 A1* | 10/2019 | Helmick ............ | G06F 3/0619 |
| 2020/0012451 A1* | 1/2020 | Benisty ............. | G06F 3/0611 |
| 2020/0050403 A1* | 2/2020 | Suri ................. | G06F 3/0655 |

* cited by examiner

*Primary Examiner* — David Yi
*Assistant Examiner* — Zubair Ahmed
(74) *Attorney, Agent, or Firm* — Brian J. Colandreo; Mark H. Whittenberger; Holland & Knight LLP

(57) ABSTRACT

A method, computer program product, and computing system for defining one or more quality of service (QOS) classes for a storage system, wherein the storage system includes a storage processor communicatively coupled to one or more non-volatile memory express (NVMe) devices. One or more queues associated with each QOS class may be generated. One or more input/output (IO) operations associated with the one or more QOS classes may be processed on the one or more NVMe devices via the one or more queues associated with each QOS class.

20 Claims, 10 Drawing Sheets

QUALITY OF SERVICE (QOS) SYSTEM AND METHOD FOR NON-VOLATILE MEMORY EXPRESS DEVICES

BACKGROUND

Storing and safeguarding electronic content may be beneficial in modern business and elsewhere. Accordingly, various methodologies may be employed to communicate data to and from storage arrays more efficiently.

Conventional approaches for accessing a non-volatile memory express (NVMe) disk-array (e.g. as done by the standard Linux® NVMe driver) include creating a single pair of input/output (IO) submission and IO completion queues per NVMe device per core of a multicore central processing unit (CPU). However, these conventional approaches do not allow any quality of service (QOS) semantics, as all IO operations submitted to a specific drive from a specific CPU go to the same queue and have no prioritization within the queue. For example, when an IO operation is inserted into the queue, it will be serviced only after all previous IO operations are fetched by the NVMe device. Since the NVMe queue depth can hold up to e.g., 64,000 commands, the latency can be high.

SUMMARY OF DISCLOSURE

In one example implementation, a computer-implemented method executed on a computing device may include, but is not limited to, defining one or more quality of service (QOS) classes for a storage system, wherein the storage system includes a storage processor communicatively coupled to one or more non-volatile memory express (NVMe) devices. One or more queues associated with each QOS class may be generated. One or more input/output (IO) operations associated with the one or more QOS classes may be processed on the one or more NVMe devices via the one or more queues associated with each QOS class.

One or more of the following example features may be included. The one or more QOS classes may be defined for at least one of one or more users of the storage system, and one or more logical storage devices of the storage system. Each QOS class may define a priority level for IO operations associated with each QOS class. A request to increase the priority level associated with a QOS class of the one or more QOS classes may be received and one or more additional queues may be generated for the one or more queues associated with the QOS class. A request to decrease the priority level associated with a QOS class of the one or more QOS classes may be received and at least one queue may be removed from the one or more queues associated with the QOS class. Processing the one or more IO operations associated with the one or more QOS classes on the one or more NVMe devices may include processing IO operations from the one or more queues associated with each QOS class via round-robin scheduling. Processing the one or more IO operations associated with the one or more QOS classes on the one or more NVMe devices may include adding each new IO operation associated with each QOS class to an emptiest queue of the one or more queues associated with each QOS class.

In another example implementation, a computer program product resides on a computer readable medium that has a plurality of instructions stored on it. When executed by a processor, the instructions cause the processor to perform operations that may include, but are not limited to, defining one or more quality of service (QOS) classes for a storage system, wherein the storage system includes a storage processor communicatively coupled to one or more non-volatile memory express (NVMe) devices. One or more queues associated with each QOS class may be generated. One or more input/output (IO) operations associated with the one or more QOS classes may be processed on the one or more NVMe devices via the one or more queues associated with each QOS class.

One or more of the following example features may be included. The one or more QOS classes may be defined for at least one of one or more users of the storage system, and one or more logical storage devices of the storage system. Each QOS class may define a priority level for IO operations associated with each QOS class. A request to increase the priority level associated with a QOS class of the one or more QOS classes may be received and one or more additional queues may be generated for the one or more queues associated with the QOS class. A request to decrease the priority level associated with a QOS class of the one or more QOS classes may be received and at least one queue may be removed from the one or more queues associated with the QOS class. Processing the one or more IO operations associated with the one or more QOS classes on the one or more NVMe devices may include processing IO operations from the one or more queues associated with each QOS class via round-robin scheduling. Processing the one or more IO operations associated with the one or more QOS classes on the one or more NVMe devices may include adding each new IO operation associated with each QOS class to an emptiest queue of the one or more queues associated with each QOS class.

In another example implementation, a computing system includes at least one processor and at least one memory architecture coupled with the at least one processor, wherein the at least one processor may be configured to define one or more quality of service (QOS) classes for a storage system, wherein the storage system includes a storage processor communicatively coupled to one or more non-volatile memory express (NVMe) devices. The at least one processor may be further configured to generate one or more queues associated with each QOS class. The at least one processor may be further configured to process the one or more input/output (IO) operations associated with the one or more QOS classes on the one or more NVMe devices via the one or more queues associated with each QOS class.

One or more of the following example features may be included. The one or more QOS classes may be defined for at least one of one or more users of the storage system, and one or more logical storage devices of the storage system. Each QOS class may define a priority level for IO operations associated with each QOS class. A request to increase the priority level associated with a QOS class of the one or more QOS classes may be received and one or more additional queues may be generated for the one or more queues associated with the QOS class. A request to decrease the priority level associated with a QOS class of the one or more QOS classes may be received and at least one queue may be removed from the one or more queues associated with the QOS class. Processing the one or more IO operations associated with the one or more QOS classes on the one or more NVMe devices may include processing IO operations from the one or more queues associated with each QOS class via round-robin scheduling. Processing the one or more IO operations associated with the one or more QOS classes on the one or more NVMe devices may include adding each new IO operation associated with each QOS class to an emptiest queue of the one or more queues associated with each QOS class.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
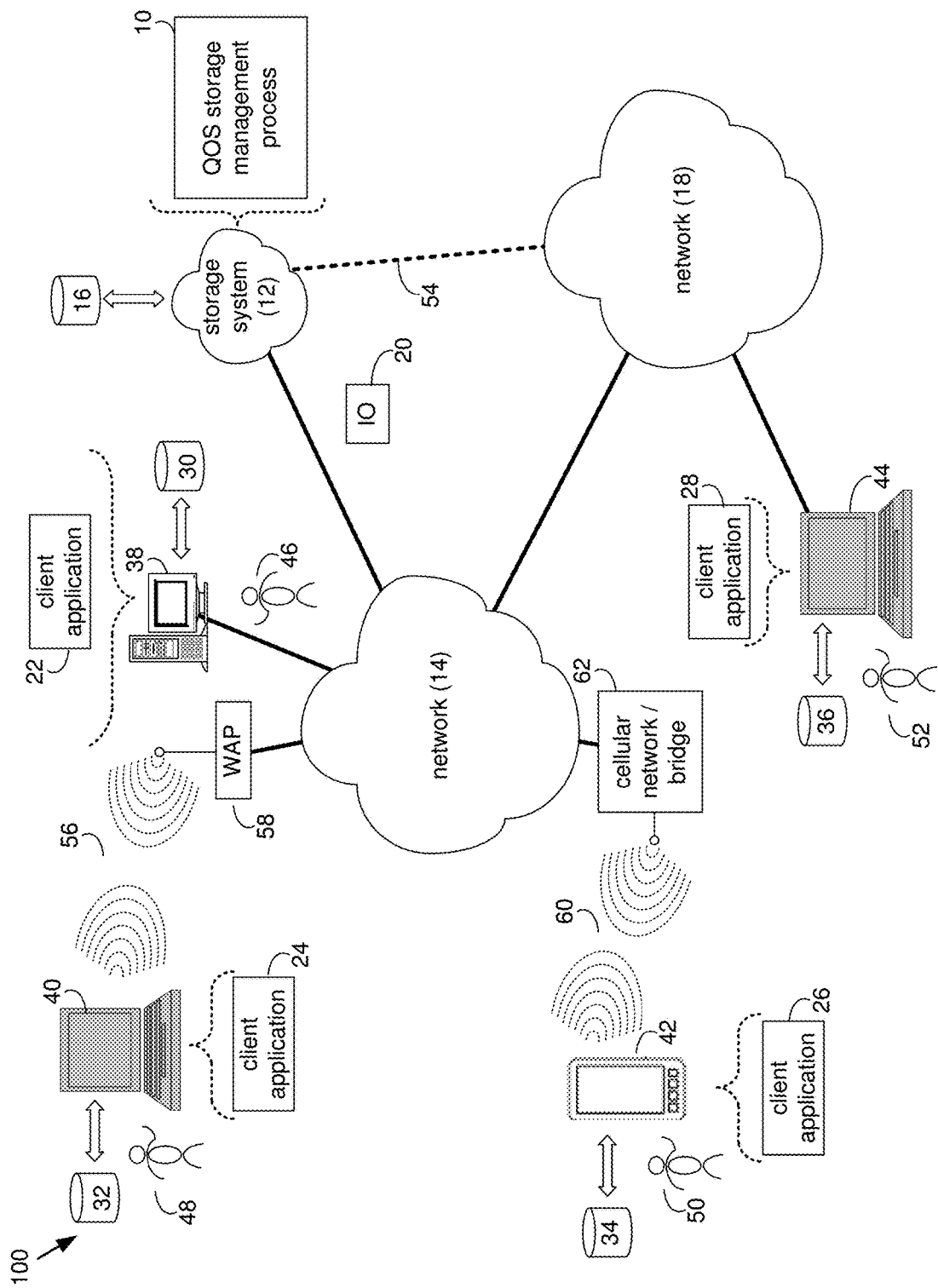
FIG. 1 is an example diagrammatic view of a storage system and a quality of service (QOS) storage management process coupled to a distributed computing network according to one or more example implementations of the disclosure.

System Overview:

Referring to FIG. 1, there is shown QOS storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of QOS storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of QOS storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as QOS storage management process 10 of FIG. 1, may include but is not limited to, defining one or more quality of service (QOS) classes for a storage system, wherein the storage system includes a storage processor communicatively coupled to one or more non-volatile memory express (NVMe) devices. One or more queues associated with each QOS class may be generated. One or more input/output (IO) operations associated with the one or more QOS classes may be processed on the one or more NVMe devices via the one or more queues associated with each QOS class.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
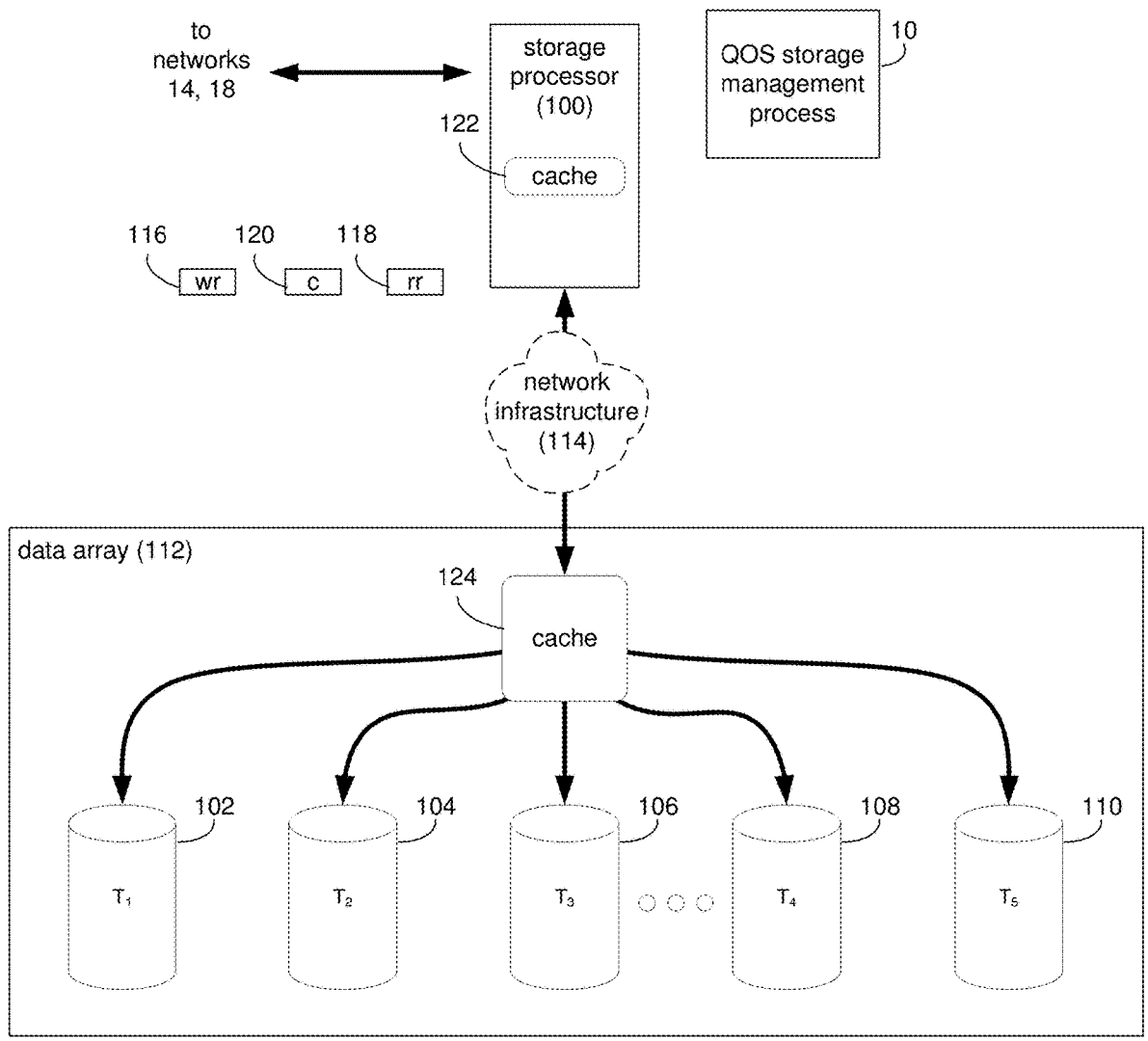
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of QOS storage management process 10. The instruction sets and subroutines of QOS storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of QOS storage management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of QOS storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of QOS storage management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Storage System Memory Architecture:

In the context of storage systems, a storage processor (e.g., storage processor 100) may include one or more central processing units (CPUs) with one or more cores, a cache memory system (e.g., cache memory system 122), and one or more network interface cards (NICs). As discussed above and in some implementations, the storage processor (e.g., storage processor 100) may be communicatively coupled with a storage array or data array (e.g., data array 112). In some implementations, the data array (e.g., data array 112) may include one or more storage devices. In some implementations, the data array may be a non-volatile memory disk array with one or more solid-state drives (SSDs). The storage processor 100 may interact with the one or more SSDs via the non-volatile memory express (NVMe) protocol or standard. In this manner, storage devices, such as SSDs, that are configured to communicate with a storage processor via the NVMe protocol may generally be referred to as NVMe devices.

As is known in the art, NVMe may generally include a host controller interface and storage protocol configured to transfer data between client systems and SSDs over a Peripheral Component Interconnect Express (PCIe) bus. Referring also to the example of FIG. 3 and in some implementations, the storage system memory architecture (e.g., within the memory system 122 of storage processor 100) may be represented a user space layer (e.g., user space layer 300) and a kernel layer (e.g., kernel layer 302). A user space layer (e.g., user space layer 300) may generally include a set of memory locations in which one or more processes (e.g., processes 304, 306, 308) are executed. A process (e.g., processes 304, 306, 308) may generally include an executing instance of a program or application. For example and in some implementations, one or more client electronic devices (e.g., client electronic devices 38, 40, 42, 44) may execute one or more programs or applications (e.g., processes 304, 306, 308) with data stored in a storage system (e.g., storage system 12) via a storage processor (e.g., storage processor 100). In some implementations, processes 304, 306, 308 may store user data (e.g., from client electronic devices 38, 40, 42, 44) and its metadata on a data array (e.g., data array 112) of storage system 12. As discussed above, the data array may include one or more NVMe devices (e.g., storage targets 102, 104, 106, 108, 110).

In some implementations, the kernel (e.g., kernel 302) may generally include the set of memory locations where the kernel of an operating system (OS) executes or runs and/or where one or more device drivers may execute. As is known in the art, the kernel may manage individual processes within the user space to prevent them from interfering with one another as they communicate data to and from the data array (e.g., data array 112). In some implementations, kernel 302 may be accessed by processes 304, 306, 308 within user space 300 by the use of system calls. Examples of system calls may include IO requests or operations configured to transfer data between a CPU and a peripheral device (e.g., one or more NVMe devices). However, it will be appreciated that other system calls are possible within the scope of the present disclosure.

In some implementations, kernel 302 may include a standard NVMe kernel driver (e.g., a standard NVMe kernel driver 310) deployed in kernel 302 for communicating data between processes 304, 306, 308 of user space 300 and one or more NVMe devices (e.g., storage targets 102, 104, 106, 108, 110). In some implementations, the standard NVMe kernel driver (e.g., standard NVMe kernel driver 310) may be a standard Linux® NVMe kernel driver generally available in most storage processors. As is known in the art, processes 304, 306, 308 may communicate with standard NVMe kernel driver 310 via a block interface (e.g., block interface 312).

Figure 3:
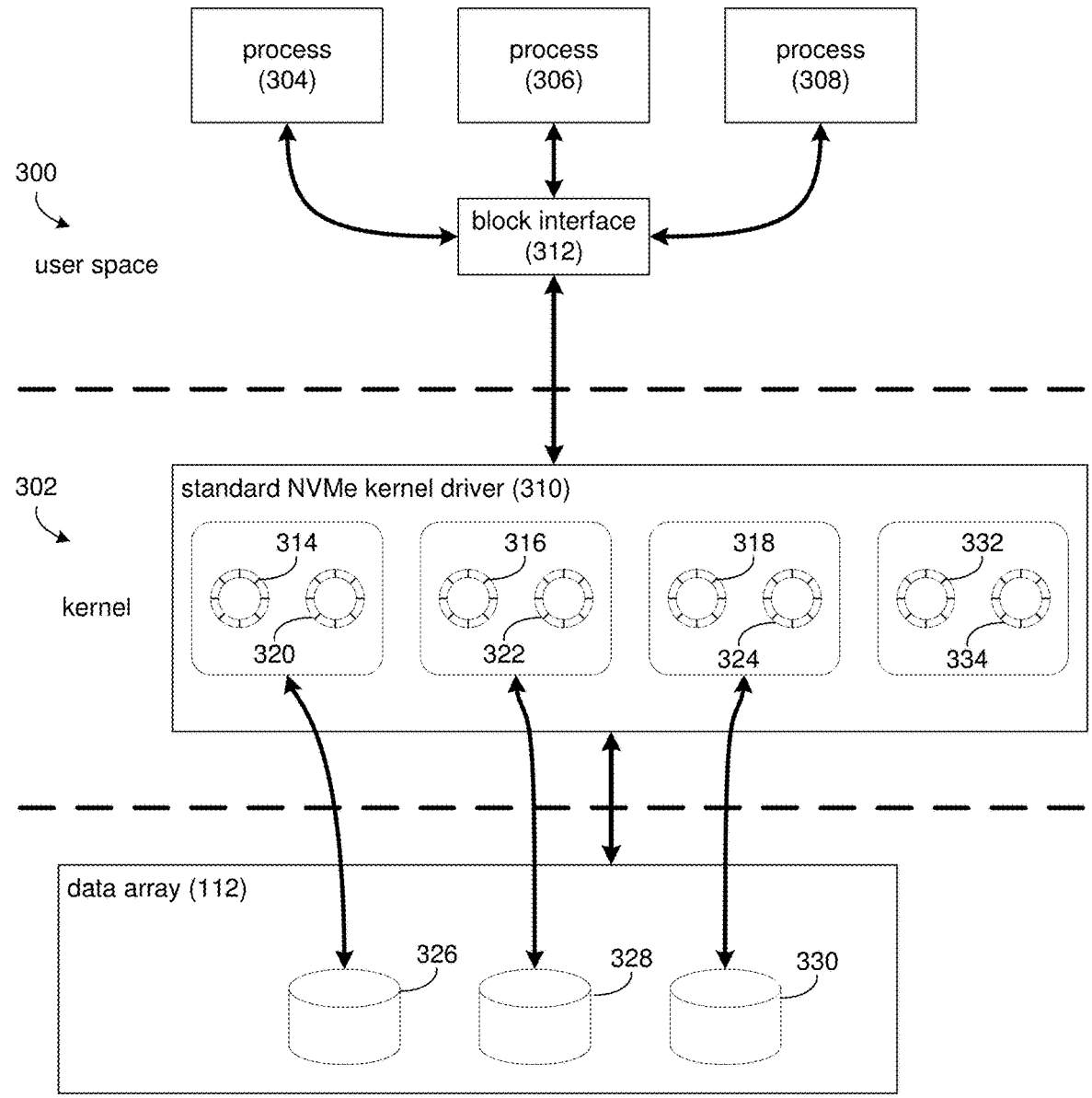
FIG. 3 is an example diagrammatic view of the storage system of FIG. 1 according to one or more example implementations of the disclosure.
Figure 4:
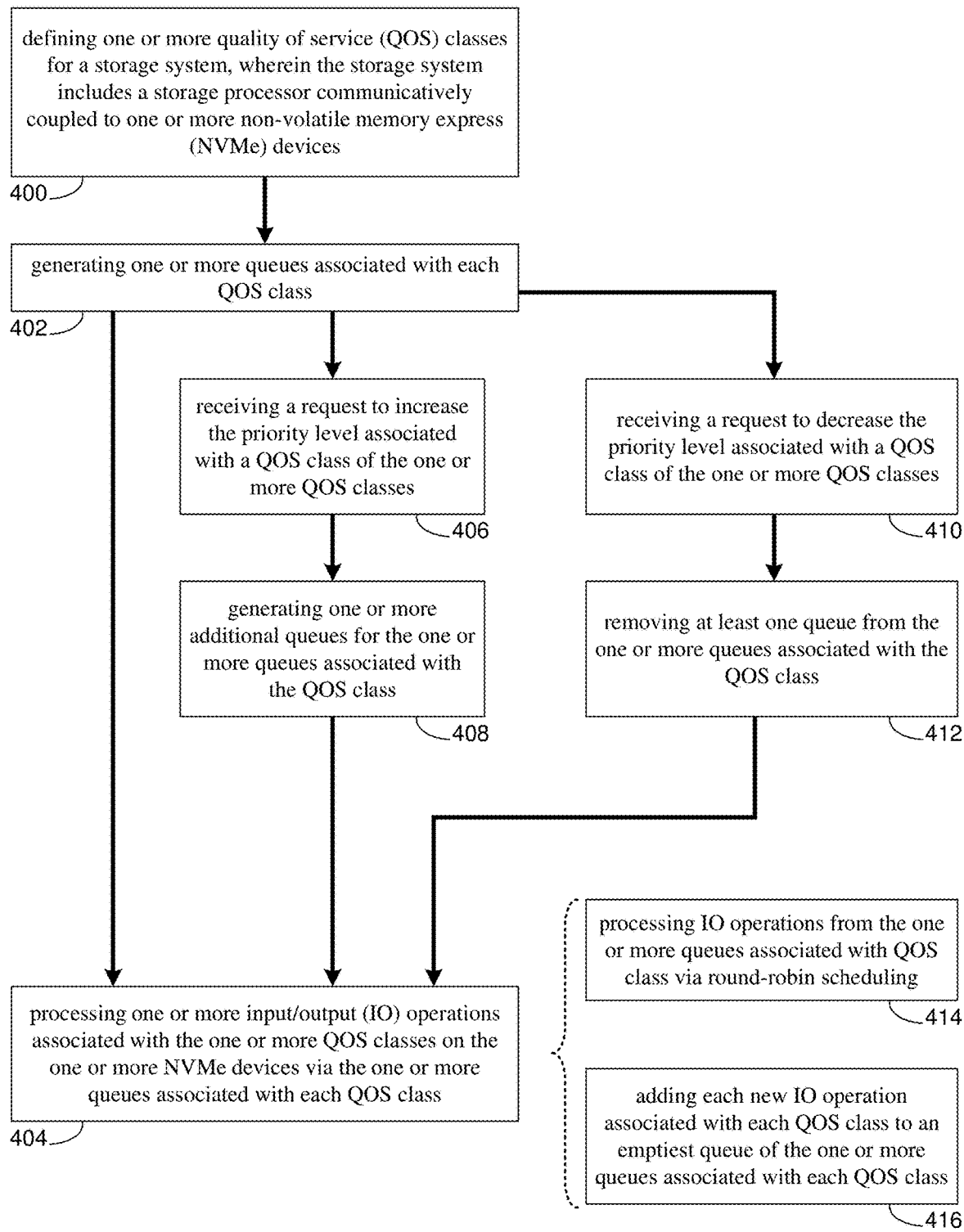
FIG. 4 is an example flowchart of the QOS storage management process of FIG. 1 according to one or more example implementations of the disclosure.

In some implementations, standard NVMe kernel driver 310 may include one or more IO submission queues (e.g., IO submission queues 314, 316, 318) and one or more IO completion queues (e.g., IO completion queues 320, 322, 324). In some implementations, IO submission queues 314, 316, 318 and IO completion queues 320, 322, 324 may be organized in pairs (e.g., IO submission queue 314 paired with IO completion queue 320). IO submission queue 314 may generally send one or more IO requests (e.g., IO request 20) to the one or more NVMe devices (e.g., storage targets 326, 328, 330) and IO completion queue 320 may generally receive a completion for a corresponding IO request of IO submission queue 314. In some implementations, the one or more IO submission queues and the one or more completion queues may be organized per core of a multi-core CPU, per NVMe device, and/or per core and per NVMe device (e.g., one or more IO submission queues and one or more IO completion queues for each core and NVMe device). In the example of FIG. 3, suppose for example purposes only that the CPU of storage processor 100 is a single core CPU. In this example, a pair of IO submission queues and IO completion queues may be created by standard NVMe kernel driver 310 for each NVMe device (e.g., NVMe devices 326, 328, 330) of a data array (e.g., data array 112). However, it will be appreciated that any number of CPU cores and/or NVMe devices may be used within the scope of the present disclosure. For example, a queue pair may be created per core to avoid using a locking mechanism to synchronize access to the queue pair from multiple cores of a multicore CPU.

In some implementations, standard NVMe kernel driver 310 may include one or more administrative IO submission queues (e.g., IO submission queue 332) and one or more administrative IO completion queues (e.g., IO completion queue 334) which may or may not be organized in pairs. Administrative IO submission queue 332 may be configured to provide one or more management operations (e.g., create and/or destroy IO submission queues, create and/or destroy IO completion queues, etc.) and administrative IO completion queue 334 may be configured to receive completions for a corresponding IO request of administrative IO submission queue 332.

In some implementations, the standard NVMe kernel driver (e.g., standard NVMe kernel driver 310) may be configured to provide a command to a plurality of doorbell registers associated with the one or more NVMe devices. A doorbell register may generally include a register configured to indicate that an IO request is ready for processing by the one or more NVMe devices and/or has been processed by the one or more NVMe devices and are logically located on each NVMe device. In some implementations, the plurality of doorbell registers may be provided by the NVMe device as part of its PCIe memory-mapped IO. There may generally be two kinds of doorbell registers: IO submission queue registers and IO completion queue registers. As will be discussed in greater detail below, the standard NVMe kernel driver (or the kernel driver extension of the present disclosure) may update the doorbell register to indicate its progress in filling up an IO submission queue or consuming the IO completion queue. For example, the one or more NVMe devices may include a plurality of doorbell registers with at least one doorbell register configured to indicate that an IO request has been provided to IO submission queue 312 and at least one doorbell register configured to indicate that an IO completion has been processed (e.g., by a process in the user space).

The Quality of Service (QOS) Storage Management Process:

Referring also to FIGS. 4-10 and in some implementations, quality of service (QOS) storage management process 10 may define 400 one or more quality of service (QOS) classes for a storage system, wherein the storage system includes a storage processor communicatively coupled to one or more non-volatile memory express (NVMe) devices. One or more queues associated with each QOS class may be generated 402. One or more input/output (IO) operations associated with the one or more QOS classes may be processed 404 on the one or more NVMe devices via the one or more queues associated with each QOS class.

As will be discussed in greater detail below, implementations of the present disclosure may allow quality of service (QOS) classes for IO operations processed on the back-end layer of storage system. Conventional approaches for accessing a NVMe disk-array (e.g. as done by the standard Linux® NVMe driver) include creating a single pair of IO submission and IO completion queues per NVMe device per core. However, these conventional approaches do not allow any QOS semantics, as all IO operations submitted to a specific drive from a specific CPU go to the same queue and have no prioritization within the queue. For example, when an IO operation is inserted into the queue, it will be serviced only after all previous IO operations are fetched by the NVMe device. Since the NVMe queue depth can hold up to e.g., 64,000 commands, the latency can be high. Accordingly, embodiments of the present disclosure may provide a back-end QOS process of utilizing queues in order to achieve QOS classes for IO operations to the back-end layer.

In some implementations, QOS storage management process 10 may define one or more quality of service (QOS) classes for a storage system, wherein the storage system includes a storage processor communicatively coupled to one or more non-volatile memory express (NVMe) devices. In some implementations, a QOS class may generally define a priority and/or bandwidth for processing IO operations in a storage system. In this manner, the QOS class may reflect a preference for the processing of certain IO operations with certain priority levels and/or bandwidth. As described above and in some implementations, conventional approaches to accessing a NVMe device within a storage system do not allow for the processing of particular IO operations based on any QOS classes.

In some implementations, the one or more QOS classes may be defined 400 for at least one of one or more users of the storage system and one or more logical storage devices of the storage system. In some implementations, a user of storage system may define 400, via QOS storage management process 10, one or more QOS classes for different logical storage devices (e.g., volumes) and/or different users (i.e. to prefer requests for some volume over other volumes and/or users over other users). For example, a user (e.g., users 46, 48, 50, 52) may interface with a user interface of QOS storage management process 10 to define 400 the QOS class for the logical storage devices of storage system 12 and/or for the various users of storage system 12.

Figure 5:
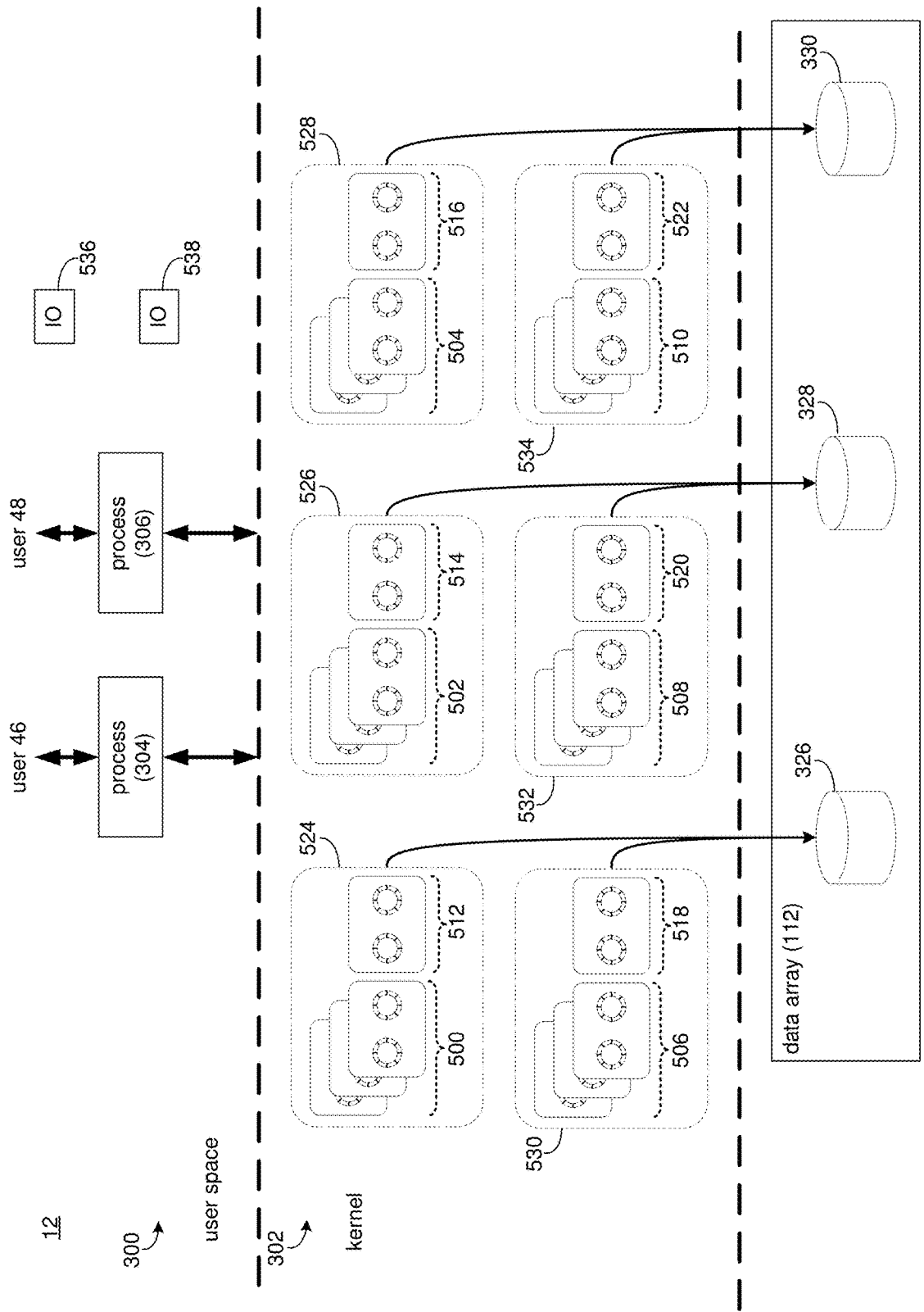
FIGS. 5-6 are example diagrammatic views of the storage system of FIG. 1 according to one or more example implementations of the disclosure.

Referring also to the example of FIG. 5 and in some implementations, the one or more QOS classes may be defined for one or more users (e.g., users 46, 48) of the storage system (e.g., storage system 12). Suppose users 46, 48, and/or a storage administrator (e.g., user 52) desire to define different levels of priority or QOS classes for various users. In this example, suppose the interaction of user 46 with the one or more NVMe devices (e.g., NVMe devices 326, 328, 330) is via process 304 and the interaction of user 48 with the one or more NVMe devices (e.g., NVMe devices 326, 328, 330) is via process 306. While the above example may include two users, it will be appreciated that any number of users may be used within the scope of the present disclosure.

For example, suppose users 46, 48, and/or a storage administrator (e.g., user 52) desire that user 46 have a first QOS class and user 48 have a second QOS class. As will be discussed in greater detail below and in some implementations, each QOS class may include a different priority for the IO operations associated with each user (e.g., users 46, 48).

In some implementations, defining 400 the one or more QOS classes for IO operations for different users may include defining a number of queues (e.g., IO submission queue and IO completion queue pairs) for each QOS class.

In some implementations, QOS storage management process 10 may define 400 one or more QOS classes for IO operations for different users when storage system 12 is a multitenant storage system. In some implementations, a multitenant storage system may have a separation between different users, so that data is managed separately. For example, each user may have e.g., different deduplication domains as opposed to a non-multitenant system where de-duplication is done globally for all users. The multitenant system may allow the separation for different reasons like security, to configure different RAID protection, allow different priority classes, etc. However, it will be appreciated that QOS storage management process 10 may define 400 one or more QOS classes for one or more users of the storage system regardless of how the user uses or accesses the data. For example, the first and second QOS classes may provide priorities for processing IO operations from each user (e.g., users 46, 48).

Figure 6:
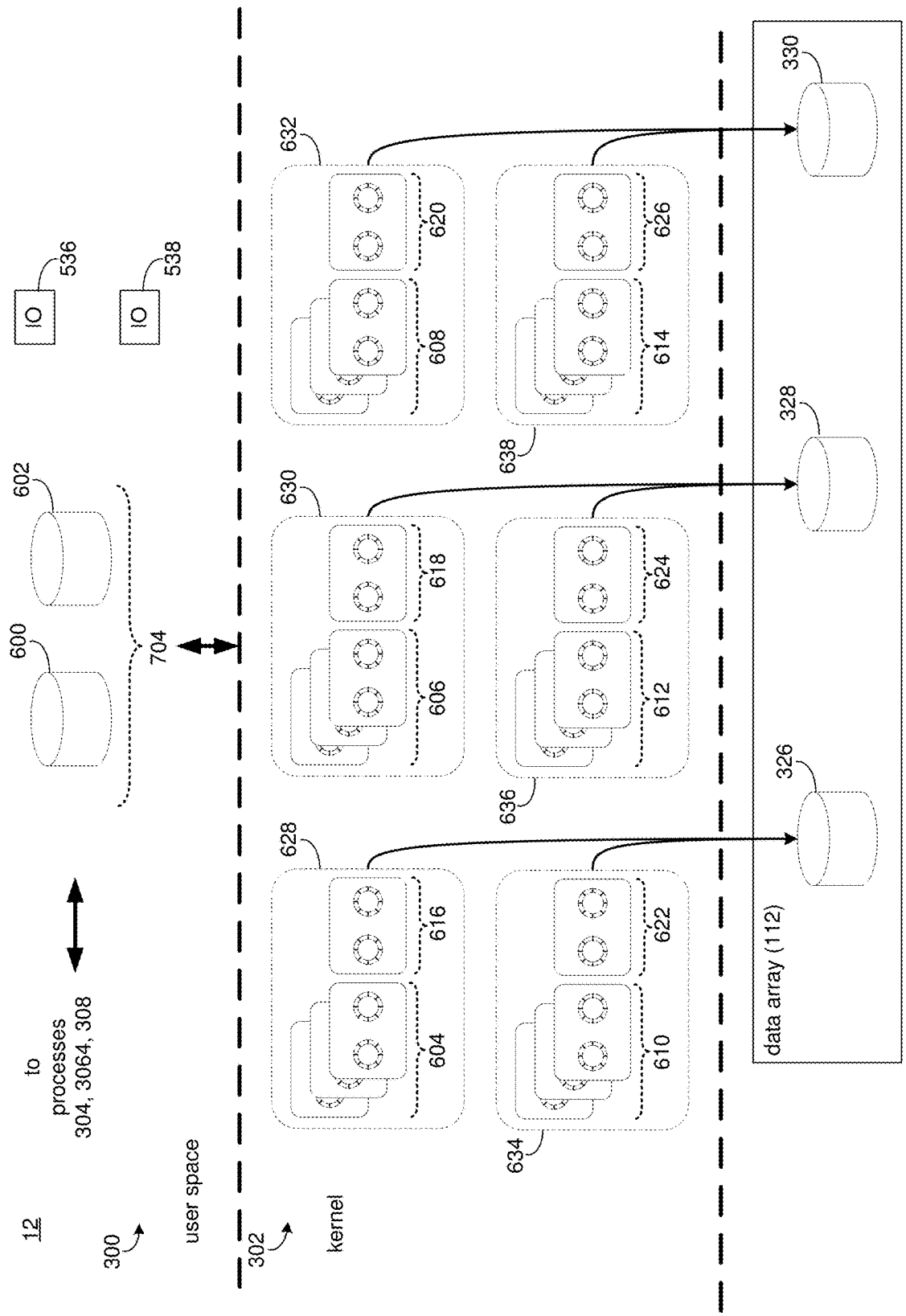

Referring also to the example of FIG. 6 and in some implementations, the one or more QOS classes may be defined 400 for one or more logical storage devices (e.g., logical storage devices 600, 602) of the storage system (e.g., storage system 12). Suppose users 46, 48, and/or a storage administrator (e.g., user 52) define 400 different levels of priority or QOS classes for various logical storage devices. A logical storage device may generally include a virtual storage device that provides an area of usable storage capacity on one or more physical disk drives in a storage system. In this example, suppose users 46, 48, and/or a storage administrator define 400 a first logical storage device (e.g., volume 600) to have a first QOS class and a second logical storage device (e.g., volume 602) have a second QOS class. As will be discussed in greater detail below and in some implementations, each QOS class may include a different priority for the IO operations associated with each logical storage device (e.g., volumes 600, 602).

In some implementations, each QOS class may define 400 a priority level for IO operations associated with each QOS class. Referring again to the example of FIG. 6 and in some implementations, suppose a user defines 400 different volumes with different priority levels (e.g. a "gold" volume 600 and a "silver" volume 602), such that if an IO operation arrives for each volume, QOS storage management process 10 should process the IO operation for gold volume 600 before processing the IO operation for silver volume 602. While an example has been provided with two QOS classes with two different priority levels, it will be appreciated that defining 400 the one or more QOS classes may include defining 400 any number of QOS classes with various priority levels within the scope of the present disclosure.

In some implementations, QOS storage management process 10 may generate 402 one or more queues associated with each QOS class. Referring again to the examples of FIGS. 5-6 and in some implementations, QOS storage management process 10 may generate 402 one or more queues associated with each QOS class based upon, at least in part, the priority level associated with each QOS class. For example, QOS storage management process 10 may generate more queues for servicing QOS classes with a higher priority level compared to QOS classes with a lower priority level.

Referring again to the example of FIG. 5 and in some implementations, suppose two QOS classes are defined; one for user 46 and one for user 48. In this example, suppose the priority level for the QOS class for user 46 is higher than the priority level for the QOS class for user 48. In this example, QOS storage management process 10 may generate 402 a plurality of queues for processing IO operations from user 46 and one or more queues for processing IO operations from user 48. As discussed above and in some implementations, QOS storage management process 10 may generate 402 queues (e.g., pairs of IO submission queues and IO completion queues) for each core of a multicore CPU for each NVMe device.

In the example of FIG. 5, suppose storage processor 100 has a dual core multicore CPU. In some implementations, QOS storage management process 10 may generate a plurality of queues associated with the QOS class for user 46 (e.g., a plurality of pairs of IO submission queues and IO completion queues 500, 502, 504, 506, 508, 510) one or more queues associated with the QOS class for user 48 (e.g., a plurality of pairs of IO submission queues and IO completion queues 512, 514, 516, 518, 520, 522). In this example, plurality of pairs of IO submission queues and IO completion queues 500, 502, 504 generated for the QOS class for user 46 may be associated with a first core of the multicore CPU of storage processor 100 and plurality of pairs of IO submission queues and IO completion queues 506, 508, 510 generated for the QOS class for user 46 may be associated with a second core of the multicore CPU of storage processor 100. Similarly, one or more pairs of IO submission queues and IO completion queues 512, 514, 516 generated for the QOS class for user 48 may be associated with a first core of the multicore CPU of storage processor 100 and plurality of pairs of IO submission queues and IO completion queues 518, 520, 522 generated for the QOS class for user 48 may be associated with a second core of the multicore CPU of storage processor 100.

Continuing with the above example of FIG. 5, suppose data array 112 has e.g., three NVMe devices (e.g., NVMe devices 326, 328, 330). In this example, QOS storage management process 10 may generate 402 plurality of pairs of IO submission queues and IO completion queues 500 for the QOS class for user 46 and one or more pairs of IO submission queues and IO completion queues 512 for the QOS class for user 48 for the first core of the multicore CPU for NVMe device 326 (e.g., subset of queues 524); plurality of pairs of IO submission queues and IO completion queues 502 for the QOS class for user 46 and one or more pairs of IO submission queues and IO completion queues 514 for the QOS class for user 48 for the first core of the multicore CPU for NVMe device 328 (e.g., subset of queues 526); plurality of pairs of IO submission queues and IO completion queues 504 for the QOS class for user 46 and one or more pairs of IO submission queues and IO completion queues 516 for the QOS class for user 48 for the first core of the multicore CPU for NVMe device 330 (e.g., subset of queues 528); plurality of pairs of IO submission queues and IO completion queues 506 for the QOS class for user 46 and one or more pairs of IO submission queues and IO completion queues 518 for the QOS class for user 48 for the second core of the multicore CPU for NVMe device 326 (e.g., subset of queues 530); plurality of pairs of IO submission queues and IO completion queues 508 for the QOS class for user 46 and one or more pairs of IO submission queues and IO completion queues 520 for the QOS class for user 48 for the first core of the multicore CPU for NVMe device 328 (e.g., subset of queues 532); and plurality of pairs of IO submission queues and IO completion queues 510 for the QOS class for user 46 and one or more pairs of IO submission queues and IO completion queues 522 for the QOS class for user 48 for the first core of the multicore CPU for NVMe device 330 (e.g., subset of queues 534).

Referring again to the example of FIG. 6 and in some implementations, suppose two QOS classes are defined; one for volume 600 and one for volume 602. In this example, suppose the priority level for the QOS class for volume 600 is higher than the priority level for the QOS class for volume 602. In this example, QOS storage management process 10 may generate 402 a plurality of queues for processing IO operations for volume 600 and one or more queues for processing IO operations for volume 602. As discussed above and in some implementations, QOS storage management process 10 may generate 402 queues (e.g., pairs of IO submission queues and IO completion queues) for each core of a multicore CPU for each NVMe device.

In the example of FIG. 6, suppose storage processor 100 has a dual core multicore CPU. In some implementations, QOS storage management process 10 may generate 402 a plurality of queues associated with the QOS class for volume 600 (e.g., a plurality of pairs of IO submission queues and IO completion queues 604, 606, 608, 610, 612, 614) one or more queues associated with the QOS class for volume 602 (e.g., a plurality of pairs of IO submission queues and IO completion queues 616, 618, 620, 622, 624, 626). In this example, plurality of pairs of IO submission queues and IO completion queues 604, 606, 608 generated 402 for the QOS class for volume 600 may be associated with a first core of the multicore CPU of storage processor 100 and plurality of pairs of IO submission queues and IO completion queues 610, 612, 614 generated for the QOS class for volume 600 may be associated with a second core of the multicore CPU of storage processor 100. Similarly, one or more pairs of IO submission queues and IO completion queues 616, 618, 620 generated 402 for the QOS class for volume 602 may be associated with a first core of the multicore CPU of storage processor 100 and plurality of pairs of IO submission queues and IO completion queues 622, 624, 626 generated for the QOS class for volume 602 may be associated with a second core of the multicore CPU of storage processor 100.

Continuing with the above example of FIG. 6, suppose data array 112 has e.g., three NVMe devices (e.g., NVMe devices 326, 328, 330). In this example, QOS storage management process 10 may generate 402 plurality of pairs of IO submission queues and IO completion queues 604 for the QOS class for volume 600 and one or more pairs of IO submission queues and IO completion queues 616 for the QOS class for volume 602 for the first core of the multicore CPU for NVMe device 326 (e.g., subset of queues 628); plurality of pairs of IO submission queues and IO completion queues 606 for the QOS class for volume 600 and one or more pairs of IO submission queues and IO completion queues 618 for the QOS class for volume 602 for the first core of the multicore CPU for NVMe device 328 (e.g., subset of queues 630); plurality of pairs of IO submission queues and IO completion queues 608 for the QOS class for volume 600 and one or more pairs of IO submission queues and IO completion queues 620 for the QOS class for volume 602 for the first core of the multicore CPU for NVMe device 330 (e.g., subset of queues 632); plurality of pairs of IO submission queues and IO completion queues 610 for the QOS class for volume 600 and one or more pairs of IO submission queues and IO completion queues 622 for the QOS class for volume 602 for the second core of the multicore CPU for NVMe device 326 (e.g., subset of queues 634); plurality of pairs of IO submission queues and IO completion queues 612 for the QOS class for volume 600 and one or more pairs of IO submission queues and IO completion queues 624 for the QOS class for volume 602 for the first core of the multicore CPU for NVMe device 328 (e.g., subset of queues 636); and plurality of pairs of IO submission queues and IO completion queues 614 for the QOS class for volume 600 and one or more pairs of IO submission queues and IO completion queues 626 for the QOS class for volume 602 for the first core of the multicore CPU for NVMe device 330 (e.g., subset of queues 638).

While the above examples of FIGS. 5-6 include e.g., two QOS classes, two cores of a multicore CPU, three IO submission queue and IO completion queue pairs for a first QOS class (e.g., QOS class for user 46/volume 600) and a single IO submission queue and IO completion queue pair for a second QOS class (e.g., QOS class for user 48/volume 602) and, it will be appreciated that any number of QOS classes, CPU cores, and/or IO submission queue and IO completion queue pairs may be used within the scope of the present disclosure.

In some implementations, QOS storage management process 10 may receive 406 a request to increase the priority level associated with a QOS class of the one or more QOS classes. For example and in some implementations, QOS storage management process 10 may receive 406 a request to increase the priority level associated with a QOS class when defining 400 the one or more QOS classes for the storage system. In another example, QOS storage management process 10 may receive 406 a request to increase the priority level associated with a QOS class for an existing QOS class previously defined 400 by QOS storage management process 10. In some implementations, receiving 406 a request to increase the priority level associated with a QOS class may include receiving a number of queues (e.g., queue pairs) per core per NVMe device for the QOS class.

In some implementations, QOS storage management process 10 may generate 408 one or more additional queues for the one or more queues associated with the QOS class. Referring again to the examples of FIGS. 5-6 and in some implementations, suppose QOS storage management process 10 previously defined 400 QOS classes for e.g., two users (e.g., as shown in FIG. 5) or for e.g., two logical storage devices (e.g., as shown in FIG. 6). In each of these examples, QOS storage management process 10 may generate 402 one or more queues for each QOS class based upon, at least in part, the priority level of each QOS class.

In the example of FIG. 5, QOS storage management process 10 may generate 402 e.g., three queue pairs (i.e., an IO submission queue and an IO completion queue) per core per NVMe device for the QOS class for user 46 and e.g., one queue pair (i.e., an IO submission queue and an IO completion queue) per core per NVMe device for the QOS class for user 48. However, suppose it was desired to increase the priority level associated with IO operations from user 46 from e.g., three queues to e.g., five queues. In this example, QOS storage management process 10 may generate 408 e.g., two additional queues (e.g., queue pairs) for the one or more queues associated with the QOS class for user 46 for a total of five queues (e.g., queue pairs) for the QOS class for user 46.

In the example of FIG. 6, QOS storage management process 10 may generate 402 e.g., three queue pairs (i.e., an IO submission queue and an IO completion queue) per core per NVMe device for the QOS class for volume 600 and e.g., one queue pair (i.e., an IO submission queue and an IO completion queue) per core per NVMe device for the QOS class for volume 602. However, suppose it was desired to increase the priority level associated with IO operations from volume 600 from e.g., three queues to e.g., five queues. In this example, QOS storage management process 10 may generate 408 e.g., two additional queues (e.g., queue pairs) for the one or more queues associated with the QOS class for volume 600 for a total of five queues (e.g., queue pairs) for the QOS class for volume 600. While an example of generating 408 e.g., two additional queues or queue pairs has been discussed, it will be appreciated that any number of additional queues may be generated 402 by QOS storage management process 10 within the scope of the present disclosure.

In some implementations, QOS storage management process 10 may receive 410 a request to decrease the priority level associated with a QOS class of the one or more QOS classes. For example and in some implementations, QOS storage management process 10 may receive 410 a request to decrease the priority level associated with a QOS class when defining 400 the one or more QOS classes for the storage system. In another example, QOS storage management process 10 may receive 410 a request to decrease the priority level associated with a QOS class for an existing QOS class previously defined 400 by QOS storage management process 10. In some implementations, receiving 410 a request to decrease the priority level associated with a QOS class may include receiving a number of queues (e.g., queue pairs) per core per NVMe device for the QOS class.

In some implementations, QOS storage management process 10 may remove 412 at least one queue from the one or more queues associated with the QOS class. Referring again to the examples of FIGS. 5-6 and in some implementations, suppose QOS storage management process 10 previously defined 400 QOS classes for e.g., two users (e.g., as shown in FIG. 5) or for e.g., two logical storage devices (e.g., as shown in FIG. 6). In each of these examples, QOS storage management process 10 may generate 402 one or more queues for each QOS class based upon, at least in part, the priority level of each QOS class.

In the example of FIG. 5, QOS storage management process 10 may generate 402 e.g., three queue pairs (i.e., an IO submission queue and an IO completion queue) per core per NVMe device for the QOS class for user 46 and e.g., one queue pair (i.e., an IO submission queue and an IO completion queue) per core per NVMe device for the QOS class for user 48. However, suppose it was desired to decrease the priority level associated with IO operations from user 46 from e.g., three queues to e.g., two queues. In this example, QOS storage management process 10 may remove 412 one queue (e.g., one queue pair) from the one or more queues (e.g., queue pairs) associated with the QOS class for user 46.

In the example of FIG. 6, QOS storage management process 10 may generate 402 e.g., three queue pairs (i.e., an IO submission queue and an IO completion queue) per core per NVMe device for the QOS class for volume 600 and e.g., one queue pair (i.e., an IO submission queue and an IO completion queue) per core per NVMe device for the QOS class for volume 602. However, suppose it was desired to decrease the priority level associated with IO operations from volume 600 from e.g., three queues to e.g., two queues. In this example, QOS storage management process 10 may remove 412 one queue (e.g., one queue) from the one or more queues (e.g., queue pairs) associated with the QOS class for volume 600. While an example of removing 412 e.g., one queue or queue pair has been discussed, it will be appreciated that any number of queues may be removed 412 by QOS storage management process 10 within the scope of the present disclosure.

In some implementations, QOS storage management process 10 may process 404 one or more input/output (IO) operations associated with the one or more QOS classes on the one or more NVMe devices via the one or more queues associated with each QOS class. Referring again to the examples of FIGS. 5-6 and in some implementations, QOS storage management process 10 may process 404 one or more IO operations (e.g., IO operation 536) associated with the first QOS class (e.g., QOS class for user 46 in FIG. 5 and volume 600 in FIG. 6) using e.g., three queue pairs (e.g., plurality of pairs of IO submission queues and IO completion queues 500, 502, 504, 506, 508, 510 in FIG. 5 and plurality of pairs of IO submission queues and IO completion queues 604, 606, 608, 610, 612, 614 in FIG. 6) and one or more IO operations (e.g., IO operation 538) associated with the second QOS class (e.g., QOS class for user 48 in FIG. 5 and volume 602 in FIG. 6) using e.g., one queue pair (e.g., one or more pairs of IO submission queues and IO completion queues 512, 514, 516, 518, 520, 522 in FIG. 5 and one or more pairs of IO submission queues and IO completion queues 616, 618, 620, 622, 624, 626 in FIG. 6).

In some implementations, processing 404 the one or more IO operations associated with the one or more QOS classes on the one or more NVMe devices may include processing 414 IO operations from the one or more queues associated with each QOS class via round-robin scheduling. Referring also to the examples of FIGS. 5-10 and in some implementations, suppose one or more IO operations are processed 404 by subset of queues 524. In this example and as discussed above, QOS storage management process 10 may generate 402 e.g., three IO submission queue and IO completion queue pairs (e.g., IO submission queue and IO completion queue pairs 700, 702, 704) for a first QOS class (e.g., QOS class for user 46 in FIG. 5 and volume 600 in FIG. 6) and e.g., one IO submission queue and IO completion queue pair (e.g., IO submission queue and IO completion queue pair 512 for a second QOS class (e.g., QOS class for user 48 in FIG. 5 and volume 602 in FIG. 6). In some implementations, the IO submission queues (e.g., IO submission queues 706, 708, 710, 712) of each IO submission queue and IO completion queue pair may be configured to receive and store one or more IO operations (e.g., IO operations 714, 716, 718, 720) for NVMe device 326. In this example, QOS storage management process 10 may receive and store IO1 (e.g., IO operation 714) on IO submission queue 712 for processing; IO2 (e.g., IO operation 720) on IO submission queue 708 for processing; IO3 (e.g., IO operation 714) on IO submission queue 708 for processing; and IO4 (e.g., IO operation 718) on IO submission queue 710 for processing. In this example, QOS storage management process 10 may receive the one or more IO operations in a sequential order (e.g., IO1, IO2, IO3, IO4).

Figure 7:
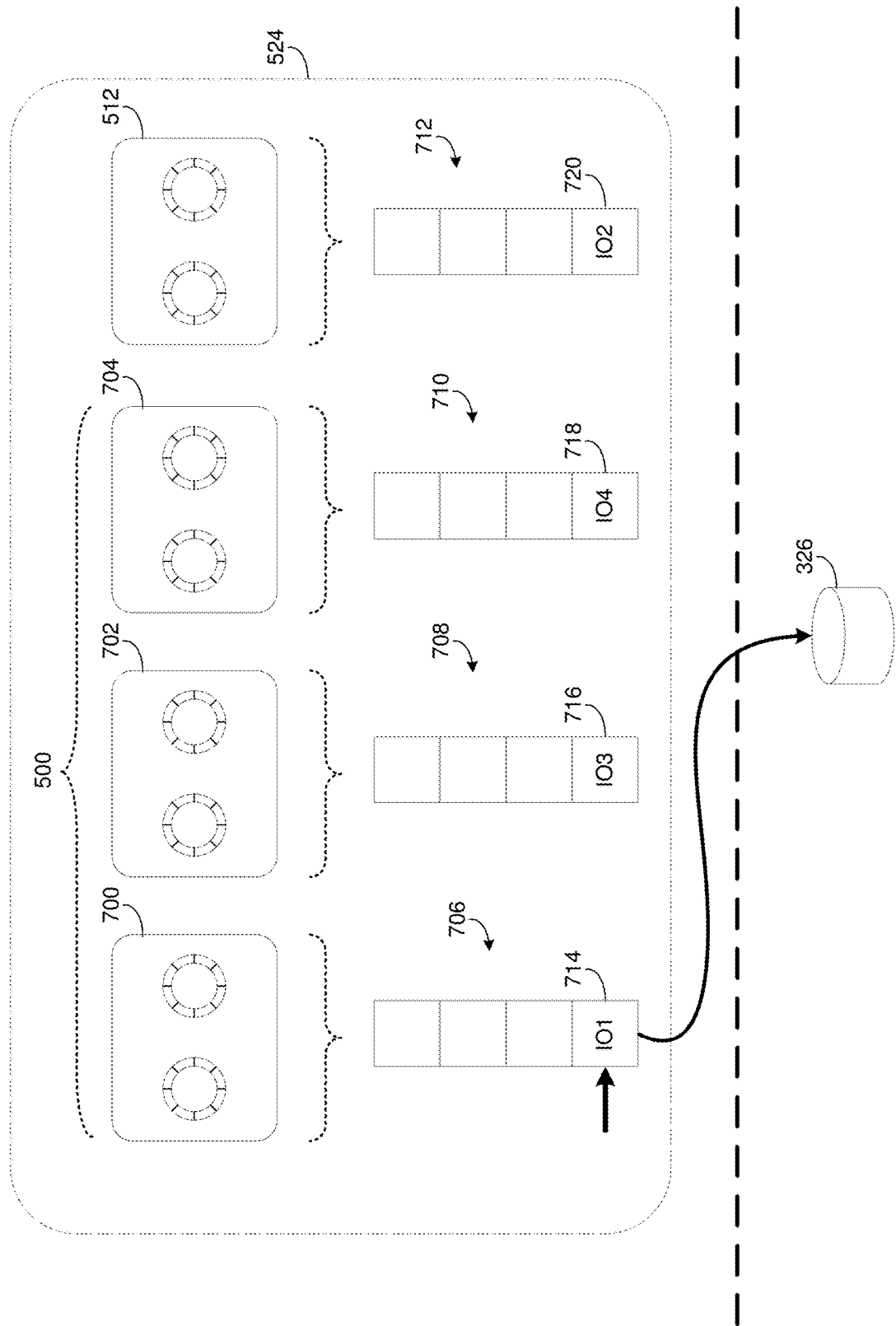
FIGS. 7-10 are example diagrammatic views of the QOS storage management process of FIG. 1 according to one or more example implementations of the disclosure.

In some implementations and referring to the example of FIG. 7, QOS storage management process 10 may process 404 the one or more IO operations (e.g., IO operations 714, 716, 718, 720) from the one or more queues (e.g., IO submission queues 706, 708, 710, 712) associated with each QOS class via round-robin scheduling. As is known in the art, round-robin scheduling may generally include a job-scheduling algorithm that iteratively processes multiple portions of data in equal slices. In the example of FIG. 7, QOS storage management process 10 may process 414 IO1 (e.g., IO operation 714) first.

Figure 8:
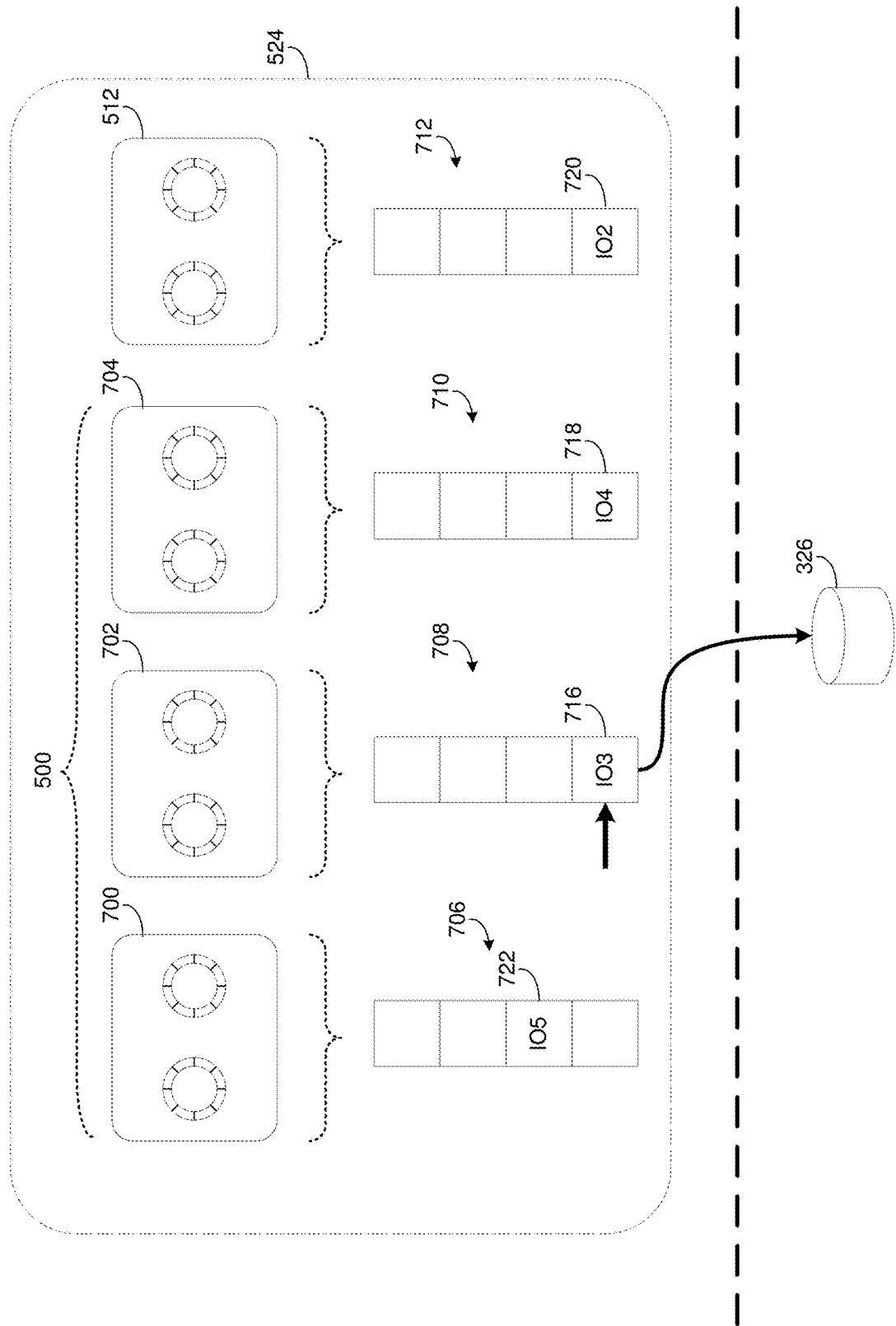

Referring also to the example of FIG. 8 and in some implementations, QOS storage management process 10 may then QOS storage management process 10 IO3 (e.g., IO operation 716) following IO1. In this example, while IO2 was received before IO3, QOS storage management process 10 may process 414 IO3 first because IO3 was received in IO submission queue 708 which has a higher priority level than IO submission queue 712. In some implementations and as will be discussed in greater detail below, QOS storage management process 10 may receive IO5 (e.g., IO operation 800) while processing IO3 (e.g., IO operation 716).

Figure 9:
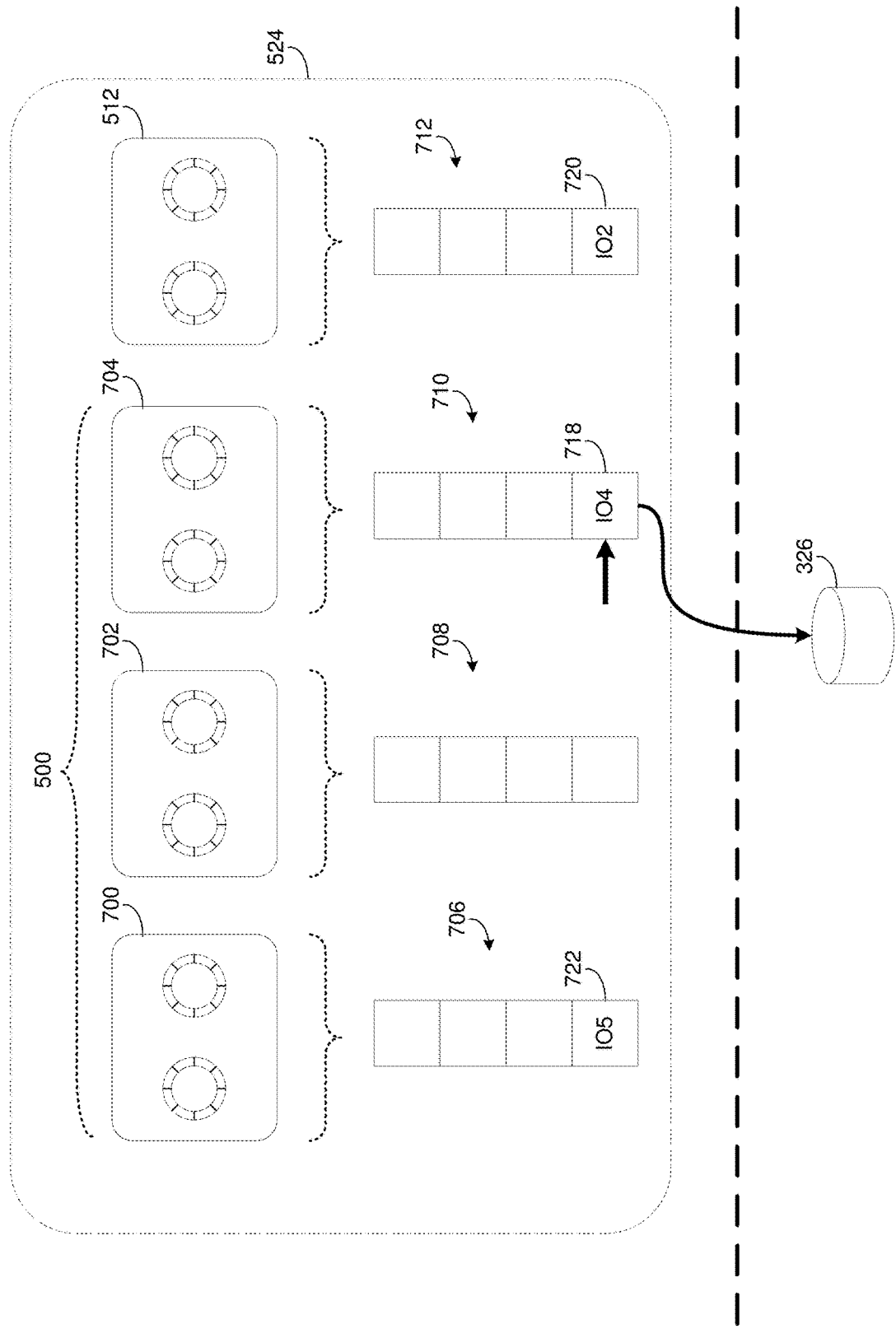

Referring also to the example of FIG. 9 and in some implementations, QOS storage management process 10 may then process 414 IO4 (e.g., IO operation 718) following IO3. In this example, while IO2 was received before IO4, QOS storage management process 10 may process 414 IO4 first because IO4 was received in IO submission queue 710 which has a higher priority level than IO submission queue 712.

Figure 10:
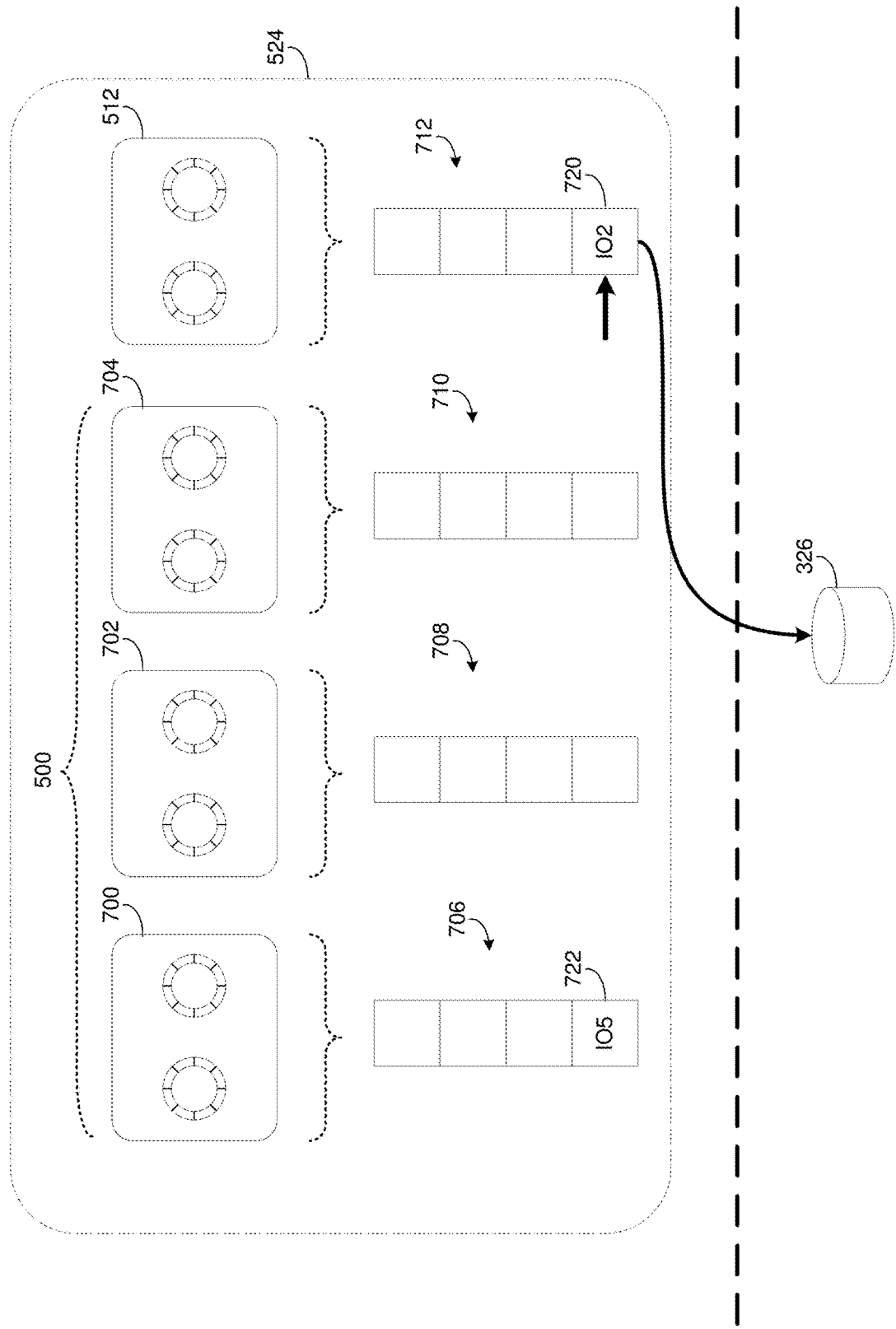

Referring also to the example of FIG. 10 and in some implementations, QOS storage management process 10 may process IO4 (e.g., IO operation 720) before processing IO5 (e.g., IO operation 800). For example, while IO5 may be received in IO submission queue 706 with a higher priority than IO submission queue 712, QOS storage management process 10 may process 404 IO2 (e.g., IO operation 720) before processing IO5 in order to avoid starvation of IO submission queues associated with a QOS class with a lower priority.

While the examples of FIGS. 7-10 may discuss round-robin scheduling for processing the one or more IO operations from the queues associated with each QOS class, it will be appreciated that any scheduling process may be used within the scope of the present disclosure for processing the one or more IO operations from the queues associated with each QOS class.

In some implementations, processing 404 the one or more IO operations associated with the one or more QOS classes on the one or more NVMe devices may include adding 416 each new IO operation associated with each QOS class to an emptiest queue of the one or more queues associated with each QOS class. Referring again to the example of FIG. 8 and in some implementations, QOS storage management process 10 may add new IO5 (e.g., IO operation 800) associated with the first QOS class (e.g., QOS class for user 46 in FIG. 5 and volume 600 in FIG. 6) to an emptiest queue (e.g., IO submission queue 706) of the one or more queues associated with each QOS class (e.g., IO submission queues 706, 708, 710). Because IO submission queue 706 is the emptiest queue of the one or more queues associated with the first QOS class, QOS storage management process 10 may add 416 IO5 (e.g., IO operation 800) to IO submission queue 706.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    defining, via the computing device, one or more quality of service (QOS) classes for a storage system, wherein the one or more QOS classes are defined for at least one of one or more users of the storage system, and one or more logical storage devices of the storage system, wherein each of the one or more users of the storage system is associated with a respective deduplication domain, wherein the storage system includes a storage processor communicatively coupled to one or more non-volatile memory express (NVMe) devices, wherein the one or more NVMe devices is configured in a RAID configuration;
    generating a plurality of queues associated with each QOS class;
    processing one or more input/output (IO) operations associated with the one or more QOS classes on the one or more NVMe devices via the plurality of queues associated with each QOS class, wherein each of the one or more QOS classes defines a priority level for the one or more IO operations associated with each of the one or more QOS classes; and
    receiving a request to increase the priority level associated with a respective QOS class of the one or more QOS classes, wherein receiving the request to increase the priority level associated with the respective QOS class includes:
        receiving a number of queue pairs, of a plurality queue pairs, per storage processor for each NVMe device associated with the respective QOS class.

2. The computer-implemented method of claim 1, further comprising:
    generating one or more additional queues for the plurality of queues associated with the QOS class.

3. The computer-implemented method of claim 1, further comprising:
    receiving a request to decrease the priority level associated with a QOS class of the one or more QOS classes; and
    removing at least one queue from the plurality of queues associated with the QOS class.

4. The computer-implemented method of claim 1, wherein processing the one or more IO operations associated with the one or more QOS classes on the one or more NVMe devices includes processing IO operations from the plurality of queues associated with each QOS class via round-robin scheduling.

5. The computer-implemented method of claim 1, wherein processing the one or more IO operations associated with the one or more QOS classes on the one or more NVMe devices includes adding each new IO operation associated with each QOS class to an emptiest queue of the plurality of queues associated with each QOS class.

6. The computer-implemented method of claim 1, wherein the storage processor includes a multicore central processing unit (CPU).

7. The computer-implemented method of claim 1, wherein the plurality of queues includes a plurality of pairs of IO submission queues and IO completion queues generated for the one or more QOS classes associated with a respective user of the one or more users.

8. The computer-implemented method of claim 7, wherein a first pair of the plurality of pairs of IO submission queues and IO completion queues are associated with a first core of a multicore central processing unit (CPU), and at least a second pair of the plurality of pairs of IO submission queues and IO completion queues are associated with a second core of the multicore CPU.

9. The computer-implemented method of claim 3, wherein receiving the request to decrease the priority level associated with the QOS class of the one or more QOS classes includes receiving a number of queue pairs, of a plurality of queue pairs, per storage processor for each NVMe device associated with the respective QOS class.

10. The computer-implemented method of claim 1, wherein receiving the request to increase the priority level associated with the respective QOS class includes receiving a request to increase the priority level associated with the respective QOS class for an existing QOS class previously defined.

11. The computer-implemented method of claim 1, wherein each queue pair of the number of queue pairs comprises a submission queue and a completion queue.

12. A computer program product residing on a non-transitory computer readable medium having a plurality of instructions stored thereon which, when executed by a processor, cause the processor to perform operations comprising:

defining one or more quality of service (QOS) classes for a storage system, wherein the one or more QOS classes are defined for at least one of one or more users of the storage system, and one or more logical storage devices of the storage system, wherein each of the one or more users of the storage system is associated with a respective deduplication domain, wherein the storage system includes a storage processor communicatively coupled to one or more non-volatile memory express (NVMe) devices, wherein the one or more NVMe devices is configured in a RAID configuration;

generating a plurality of queues associated with each QOS class;

processing one or more input/output (IO) operations associated with the one or more QOS classes on the one or more NVMe devices via the plurality of queues associated with each QOS class, wherein each of the one or more QOS classes defines a priority level for the one or more IO operations associated with each of the one or more QOS classes; and receiving a request to increase the priority level associated with a respective QOS class of the one or more QOS classes, wherein receiving the request to increase the priority level associated with the respective QOS class includes:

receiving a number of queue pairs, of a plurality of queue pairs, per storage processor for each NVMe device associated with the respective QOS class.

13. The computer program product of claim 12, wherein the operations further comprise:

generating one or more additional queues for the plurality of queues associated with the QOS class.

14. The computer program product of claim 12, further comprising:

receiving a request to decrease the priority level associated with a QOS class of the one or more QOS classes; and removing at least one queue from the plurality of queues associated with the QOS class.

15. The computer program product of claim 12, wherein processing the one or more IO operations associated with the one or more QOS classes on the one or more NVMe devices includes processing IO operations from the plurality of queues associated with each QOS class via round-robin scheduling.

16. The computer program product of claim 12, wherein processing the one or more IO operations associated with the one or more QOS classes on the one or more NVMe devices includes adding each new IO operation associated with each QOS class to an emptiest queue of the plurality of queues associated with each QOS class.

17. A computing system comprising:
a memory; and
a processor configured to:
define one or more quality of service (QOS) classes for a storage system, wherein the one or more QOS classes are defined for at least one of one or more users of the storage system, and one or more logical storage devices of the storage system, wherein each of the one or more users of the storage system is associated with a respective deduplication domain, wherein the storage system includes a storage processor communicatively coupled to one or more non-volatile memory express (NVMe) devices, wherein the one or more NVMe devices is configured in a RAID configuration;
generate a plurality of queues associated with each QOS class;
process one or more input/output (IO) operations associated with the one or more QOS classes on the one or more NVMe devices via the plurality of queues associated with each QOS class, wherein each of the one or more QOS classes defines a priority level for the one or more IO operations associated with each of the one or more QOS classes; and
receiving a request to increase the priority level associated with a respective QOS class of the one or more QOS classes, wherein receiving the request to increase the priority level associated with the respective QOS class includes:
receiving a number of queue pairs, of a plurality of queue pairs, per storage processor for each NVMe device associated with the respective QOS class.

18. The computing system of claim 17, wherein the processor is further configured to:
generate one or more additional queues for the plurality of queues associated with the QOS class.

19. The computing system of claim 17, wherein the processor is further configured to:
receive a request to decrease the priority level associated with a QOS class of the one or more QOS classes; and
remove at least one queue from the plurality of queues associated with the QOS class.

20. The computing system of claim 17, wherein processing the one or more TO operations associated with the one or more QOS classes on the one or more NVMe devices includes adding each new TO operation associated with each QOS class to an emptiest queue of the plurality of queues associated with each QOS class.

* * * * *